(12) United States Patent
Fermigier et al.

(10) Patent No.: US 8,348,423 B2
(45) Date of Patent: Jan. 8, 2013

(54) CURVED DISC FOR MODIFYING A POWER OF AN OPTICAL COMPONENT

(75) Inventors: Bruno Fermigier, Charenton le Pont (FR); Matthieu Koscher, Charenton le Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 326 days.

(21) Appl. No.: 12/746,193

(22) PCT Filed: Dec. 4, 2008

(86) PCT No.: PCT/FR2008/052205
§ 371 (c)(1), (2), (4) Date: Jun. 4, 2010

(87) PCT Pub. No.: WO2009/080940
PCT Pub. Date: Jul. 2, 2009

(65) Prior Publication Data
US 2010/0259717 A1 Oct. 14, 2010

(30) Foreign Application Priority Data
Dec. 7, 2007 (FR) ..................... 07 59664

(51) Int. Cl.
*G02C 7/14* (2006.01)
*G02C 7/06* (2006.01)
*G02C 7/02* (2006.01)
(52) U.S. Cl. ......... 351/159.58; 351/159.45; 351/159.48; 351/159.7

(58) Field of Classification Search ............. 351/159.12, 351/159.13, 159.45, 159.48, 159.58, 159.7
See application file for complete search history.

(56) References Cited

U.S. PATENT DOCUMENTS

| | | | |
|---|---|---|---|
| 3,904,281 A | 9/1975 | Jampolsky | |
| 4,070,105 A | 1/1978 | Marzouk | |
| 4,146,306 A | 3/1979 | Wallach | |
| 4,210,391 A | 7/1980 | Cohen | |
| 5,054,905 A * | 10/1991 | Cohen | 351/159.42 |
| 5,104,212 A | 4/1992 | Taboury et al. | |
| 5,982,543 A | 11/1999 | Fiala | |

(Continued)

FOREIGN PATENT DOCUMENTS
EP 0368751 5/1990
(Continued)

OTHER PUBLICATIONS

The Fresnel Prism and Lens Co., LLC, *3m Press-On Optics*, Retrieved from URL:http://www.fresnelprism.com/3MPOP.html, on Mar. 24, 2006 (1 page).

*Primary Examiner* — Scott J Sugarman
(74) *Attorney, Agent, or Firm* — Occhiuti Rohlicek & Tsao LLP

(57) ABSTRACT

Disc designed to be attached to a concave curved surface of an optical component to modify an optical power of said component, the disc comprising a Fresnel lens made up of a series of Fresnel regions of spherical general shape, in which the changes of height between successive Fresnel regions are located on a concave face of the disc, and in which said Fresnel regions are made out in a special distribution. A disc of this kind maintains the dioptric quality without introducing distortions.

21 Claims, 2 Drawing Sheets

U.S. PATENT DOCUMENTS

| | | |
|---|---|---|
| 6,170,952 B1 | 1/2001 | La Haye et al. |
| 2005/0185300 A1 | 8/2005 | Kittelmann et al. |
| 2006/0109554 A1 | 5/2006 | Chen |

FOREIGN PATENT DOCUMENTS

| | | |
|---|---|---|
| EP | 1548353 | 6/2005 |
| JP | 01243016 | 12/1989 |
| JP | 06174904 | 9/1994 |
| WO | 86/06846 | 11/1986 |
| WO | 97/10527 | 3/1997 |
| WO | 2007/141440 | 12/2007 |

* cited by examiner

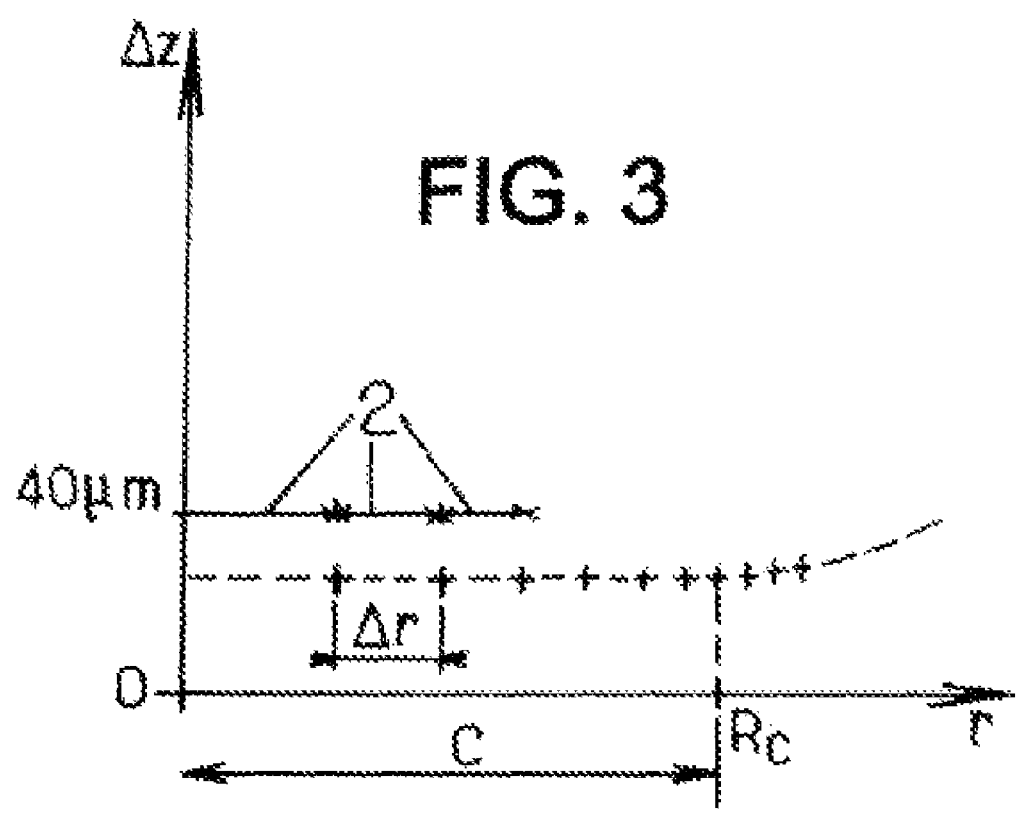

CURVED DISC FOR MODIFYING A POWER OF AN OPTICAL COMPONENT

CROSS-REFERENCE TO RELATED APPLICATIONS

This application is the National Stage of International Application No. PCT/FR2008/052205, filed on Dec. 4, 2008, which claims the priority of French Application No. 07 59664 filed on Dec. 7, 2007, the contents of which are incorporated herein by reference in their entirety.

The invention relates to a curved disc intended to be attached to a concave face of an optical component in order to modify an optical power of said component. It also relates to an optical element and a pair of glasses which incorporate such a disc.

It can be useful to adapt the power of an optical component for a particular use. This may be the case, for example, in adapting a sunglasses lens to the ametropia of a wearer of this lens. In the context of the invention, the power of an optical component designates the vergence of this element, and is commonly expressed in diopters.

It is known to make a disc of transparent material which is intended to be applied to a face of an optical component, in order to modify the power of said component. The disc comprises a Fresnel lens which is formed from a series of Fresnel zones nested inside one another parallel to a smooth face of the disc. These zones have height differences between two successive zones which are greater than five times a mean wavelength of visible light, the height differences being measured along a direction perpendicular to the tangent of the smooth face. Under these conditions, the disc itself has an optical power which results from the refraction of light rays on the two faces of the disc in each Fresnel zone. This optical power of the disc is added to that of the optical component to which it is applied. The use of a Fresnel lens shape reduces the thickness of the disc in order to obtain a fixed power modification, compared to an additional lens that would be attached to the optical component.

These discs have an initially flat shape, and must be bent when they are applied to the curved surface of an ophthalmic lens or glass. Such discs are described in US U.S. Pat. No. 3,904,291. This deformation of the disc when it is applied to the ophthalmic glass or lens creates distortions in images formed through the glass or lens once the disc has been applied to it, as well as optical aberrations. In particular, the image distortions vary dynamically when the observed object is moving within the field of vision or when the lens wearer turns his head while following a watched object. These image distortions then become an annoyance. In addition, defects related to scattering and/or diffraction may appear in different zones of the disc, reinforcing the annoyance to the wearer and/or interfering with the aesthetic quality of the object. This loss of aesthetics is identifiable by an observer facing the wearer. Such defects become increasingly significant as the optical power modification provided by the disc increases. It has also been observed that when a power modification disc changes from a flat surface to a curved surface, this results in a refractive defect. The initial power of the disc in its flat form and the actual power of the disc once applied to an optical component therefore differ. This difference is extremely detrimental to the quality of vision provided to a wearer.

One object of the invention is to propose an optical power modification disc which does not have the above disadvantages and which is simple to use. The product of the invention must be easy to employ by a wearer who wants a simple means for correcting his vision, for adapting to the power of an optical component such as an ophthalmic lens, by simple application of the power modification disc to any optical equipment.

One solution to this technical problem consists of creating a Fresnel structure within a disk having a spherical surface, said spherical surface being substantially identical to the spherical surface of the optical component that is to receive said disc. In such a configuration, the product of the invention solves the distortion problems observed in state of the art elements when a flat surface changes to a curved surface. This is one of the characteristics of the invention.

To obtain the best fit for the power modification disc, it is necessary to take into consideration the curvature of the optical component that is to receive said disc, when designing the profile of the Fresnel structure of the disc. However, such a power modification means may have optical defects due to diffraction, or due to scattering, depending on the zones in said disc. These different issues have a global solution in the object of the invention. Thus the invention comprises a power modification disc with Fresnel zones that has a generally spherical shape in which the step and amplitude distribution profile of the Fresnel zones is carefully selected: such a selection enables, in the product of the invention, for a given correction power and an established disc diameter, the elimination of the distortions as previously described and in particular the maintaining of the initial power of the disc when it is applied to an optical component. In addition, this specific distribution of the Fresnel zones within the disc allows minimizing the diffraction in a central zone of the object and minimizing the scattering in a non-central zone of the disc, the latter possibly being induced due to the resolution limitations of the tools and means which allow the creation of such structures.

To achieve this, the invention proposes a disc of the type described above and having a series of Fresnel zones on its spherical concave face, the disc being intended to be attached to a curved concave surface of an optical component in order to modify the power of said component. "Modify" is understood to mean either contributing optical power to an optical component that has no such power, or varying the optical power of an optical component already having its own optical power. Thus, in the invention, the disc has a generally spherical shape in addition to height differences present between Fresnel zones, said Fresnel zones being present on the concave face of said disc, and the face of the disc in contact with the optical component being the smooth convex face of said disc. In other words, the smooth convex face of the disk has an initial curvature which substantially corresponds to the shape of the concave curved surface of the optical component intended to receive said disc. In one embodiment of the invention, this smooth convex face of the disc can have a cylindrical surface or a toric surface. In such an embodiment, the disc of the invention can incorporate an astigmatism correction for a wearer. In fact, an astigmatic surface is characterized by the fact that the two principal meridians do not have the same radius of curvature.

The concave face of the disc which comprises the height differences additionally has a mean curvature which also corresponds to said curved surface of the optical component. This face is intended to be in contact with the ambient medium. Thus the general profile of the Fresnel structure over the entire disc has a spherical geometry.

In the invention, "optical component" is understood to mean visors such as helmet visors, and ophthalmic lenses; "ophthalmic lenses" is understood to mean the lenses that mount into a spectacle frame, or into a mask or goggles such as ski goggles, sun goggles, or a diving mask, as well as goggles intended to protect the eyes and/or correct the vision, said lenses being chosen from among afocal, unifocal, bifocal, or progressive addition lenses. "Mask or goggles", such as sun goggles, is understood to mean a lens consisting of a single piece intended to be positioned in front of both eyes. Such ophthalmic lenses or visors may be tinted. These optical components within the meaning of the invention can optionally have one or more functions provided by the application of one or more coatings, and such coatings in particular may be chosen from among photochromic, anti-reflective, anti-smudge, impact-resistant, anti-scratch, polarizing, and anti-static. The invention is particularly suitable for corrective or non-corrective ophthalmic lenses. The curved power modification disc of the invention is made up of a material able to provide cohesion with the optical component to which it is to be attached, this cohesion being either natural and due to the intrinsic adhesive properties of the material, also known as tack or tackiness, or initiated by means of depositing a thin layer of water which acts as a vector in initiating and facilitating the establishing of contact between the disc and the optical component.

The invention thus comprises a disc intended to be attached to a curved concave surface of an optical component in order to modify an optical power of said component, with the disc comprising a Fresnel lens formed of a series of Fresnel zones nested inside one another parallel to a smooth face of said disc and having height differences between two successive zones, said height differences being measured along a direction (z) perpendicular to the smooth face at an optical center of the disc (O), wherein the disc possesses:

a generally spherical shape in addition to height differences between successive Fresnel zones, said generally spherical shape having a mean radius of curvature of between 135 mm and 53 mm, and wherein the height differences between successive Fresnel zones are situated on a concave face of the disc, said height differences between successive Fresnel zones having:

constant amplitudes within a radius circle (C) surrounding the optical center of the disc (O) and of a dimension defined as a function of the power of the disc, and variable amplitudes which increase in a peripheral part of the disc, when traveling away from the optical center (O) and outside of said circle (C), said radius circle (C) having a value of between 5 mm and 25 mm for a power of between 1 diopter and 10 diopters, and a first central height difference amplitude greater than or equal to 5 µm.

In a preferred embodiment of the invention, the disc has a generally spherical shape comprising a mean radius of curvature of between 88 mm and 53 mm, most preferably substantially equal to 66 mm. This mean radius of curvature of 66 mm corresponds to an ophthalmic lens of base curve 8, this base being the one preferentially used in sun-protective ophthalmic lenses, meaning those comprising a filtering function. These sun-protective ophthalmic lenses conventionally have a visible light transmission rate of between 88% and 6%. Such ophthalmic lenses meet the criteria of filters of category 1 to 4 as defined in the international classification used to classify sun-protective filters.

In the invention, the height differences between successive Fresnel zones have constant amplitudes within a zone surrounding the optical center of the disc. The concave face of the disc which comprises the height differences therefore has a constant relief height in the central part of this face. This contributes to specifically limiting diffraction at the center of the disc. Also, in a second characteristic, the height differences between successive Fresnel zones outside this previously mentioned central zone surrounding the optical center, have varying amplitudes out to the external edges of said disc, this type of specific profile limiting the scattering in this zone of the power modification disc. The adjustment of the sizing of the constant amplitude in a central zone and of the variable amplitude in a zone external to this central zone is selected as a function of the power and diameter of the power modification disc, with these two parameters adjusted as a function of the visual correction to be achieved for the wearer and as a function of his choice of optical component to which the object of the invention is to be fitted.

The invention also relates to an optical element comprising a base optical component and a disc as described above, said disc being attached to the concave rear face of the component by means of its smooth convex face.

As previously described, the base optical component may be an ophthalmic lens. Preferably, such an ophthalmic lens is tinted or partially reflective and may have optical properties to correct an ametropia. The disc is then barely visible and does not reduce the aesthetics of a pair of glasses which comprise the lens, when it is applied to the concave face, or posterior face, of the lens. The specific distribution profile of the constant and variable amplitudes of the Fresnel zones in the disc of the invention thus enables greatly improving the aesthetics of the device, particularly by minimizing the physical effects of light diffraction and scattering. These effects not only adversely impact the comfort and optical quality provided to the wearer, but are also a distraction to an observer facing the wearer.

The invention also concerns a pair of glasses which comprises at least one lens and a disc as described above, attached to the lens. Such a pair of glasses may in particular be tinted or untinted glasses to correct ametropia, or a non-corrective sun-protective mask or glasses or goggles.

Other features and advantages of the invention will be apparent from the following description of non-limiting examples, which refers to the attached drawings in which:

FIG. 3 is a diagram illustrating the variations in height differences for a disc of the invention.

For clarity, the dimensions of elements represented are not in proportion to actual dimensions or dimension ratios. In addition, identical labels in different figures designate the same elements.

Figure 1A:
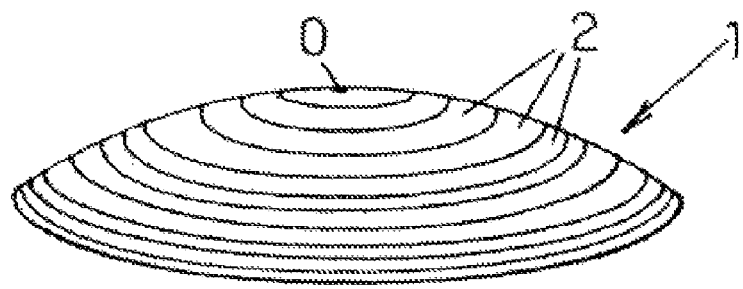
FIG. 1a is a perspective view of a disc of the invention.
Figure 1B:
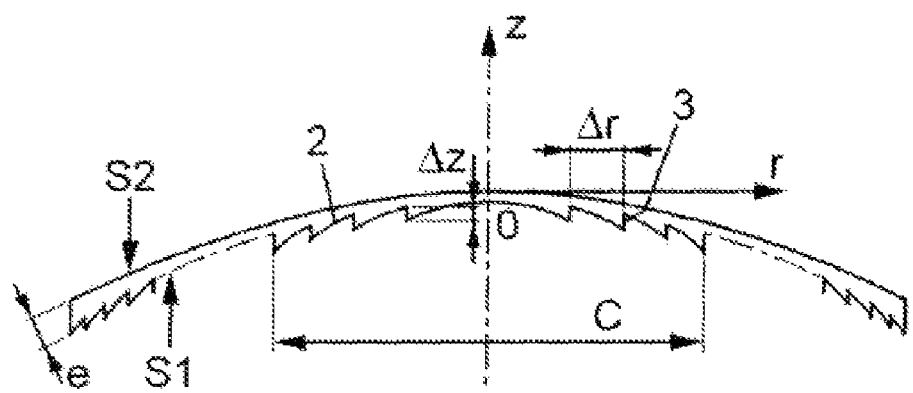
FIG. 1b is a cross-section view of a disc of the invention.

As shown in FIGS. 1a and 1b, a disc 1 of the invention has a generally spherical or cup shape. Preferably, the disc has a spherical dome shape, with a mean radius of curvature which can be on the order of 66 mm (millimeters) for example. Such a radius of curvature corresponds to the shape of the posterior face, or concave face, of many ophthalmic lenses for glasses. In the invention, the discs have a mean radius of curvature of between 135 mm and 53 mm, and advantageously between 88 mm and 53 mm.

The disc 1 constitutes a Fresnel lens: it is formed of a succession of Fresnel zones which are arranged concentrically and contiguously, for example 100 to 200 zones. These zones, labeled 2 in the figures, are coaxial rings oriented and centered around an optical axis denoted z. The z axis then passes through an optical center of the disc, which is situated on the disc and is denoted by O. In a known manner, each Fresnel zone corresponds to a lens portion, and the thickness of the disc 1 varies continuously within this zone in a radial direction, denoted r, in a plane perpendicular to the axis z.

Between two success zones 2, one of the surfaces of the disc 1 has a height difference parallel to the axis z, denoted by 3. Its amplitude is denoted by Δz. Note that the height differences 3 which are present between successive zones 2 are superimposed onto the general shape of the disc 1, this general shape being rounded, according to the invention.

The height differences 3 correspond to discontinuities in the height of the concave face of the disc 1, denoted by S1; this face is intended to remain in contact with the ambient medium. Between two successive height differences 3, a Fresnel zone 2 has a radial dimension which is denoted by Δr, measured perpendicularly to the axis z. The convex face of the disc 1, denoted by S2, is therefore smooth and is intended to be placed in contact with an optical component in order to form an optical element of the the invention. e designates the mean thickness of the disc 1, between the faces S1 and S2. It is measured perpendicularly to the face S2. Preferably, the mean thickness e is between 2 mm (millimeters) and 0.5 mm. This low thickness of the disc allows limiting the thickness of the optical element, and therefore maintaining the aesthetics of the object. In addition, as the amount of material added to the optical component is low, this limits the total weight of the optical element.

In order to minimize light scattering and diffraction and not cause any iridescence, even if these phenomena are not perceptible, the Fresnel zones 2 are sized such that the amplitudes Δz of the height differences 3 are at least equal to five times a mean wavelength of visible light. In addition, these Fresnel zones are distributed according to amplitudes Δz which are constant and variable as a function of their position relative to the optical center (O) of the disc. In general, the amplitudes of the height differences 3 are between 5 μm (micrometers) and 250 μm. In this manner, because of the short coherence length of natural light, there is no perceptible interference occurring between parts of a light beam traversing different zones 2. In other words, the disc 1 has a purely refractive optical effect, related to the shape of the surfaces S2 and S2 in each zone 2, and does not generate any visible diffractive effect. As described above, the amplitudes of the height differences 3 between successive Fresnel zones are constant over a central part (C) and variable over a part of the surface of the disc extending from the outside of the circle (C) to a peripheral part, while maintaining a substantially spherical profile at the surface (S1). In this configuration, the amplitude Δz is greater at the edges of the disc than in its central zone. Thus, in the invention, the disc is such that the height differences (3) between successive Fresnel zones within the circle (C) have amplitudes of between 5 μm and 25 μm, and the height differences (3) between successive Fresnel zones outside the circle (C) and out to a peripheral part of the disc have variable amplitudes of between 5 μm and 250 μm.

Advantageously, the disc is such that the height differences (3) between successive Fresnel zones within the circle (C) have amplitudes of between 10 μm and 20 μm.

In one embodiment of the invention, the disc may have on its lateral external peripheral edge a third peripheral zone defined as (A) in FIG. 1b, comprising constant height differences. This peripheral zone is sometimes called a non-usable zone. In fact, it is known to a person skilled in the art that the optically usable zone covers the entire lens which has a limited diameter. However, in certain cases, a peripheral zone is provided at the perimeter of the ophthalmic lens. This zone is said to be peripheral because it does not satisfy the prescribed optical correction conditions and has obliquity defects. The defects of this peripheral zone do not interfere with the viewing of the wearer because this zone is located outside the visual field of the wearer. This peripheral zone (A) may therefore be provided for in the power modification disc, and for manufacturing and/or aesthetic reasons it may be advantageous for it to have Fresnel zones with constant amplitudes. Thus, in this embodiment, the height differences (3) between successive Fresnel zones in the peripheral zone (A) have constant amplitudes, said amplitude corresponding to the amplitude of the last height difference (3) between successive Fresnel zones outside the circle (C), and a constant dimension (Δr) corresponding to the constant dimension (Δr) between successive Fresnel zones outside the circle (C).

The radial dimension Δr of each zone 2 then depends on the optical power of the disc 1 and on the amplitude Δz of the height differences 3. Under the above conditions, for an optical power of the disc 1 which is less than or equal to 10 diopters, Δr may be between 100 μm and 5 mm. In the invention, the disc is such that the Fresnel zones (2) have a variable dimension (Δr) of between 5 mm and 100 μm inside the circle (C), with the largest dimension being located closest to the center (O) of the circle (C), and the Fresnel zones (2) have a constant dimension (Δr) of between 500 μm and 100 μm outside the circle (C). Preferably, the disc of the invention is such that the Fresnel zones (2) have a variable dimension (Δr) of between 2.5 mm and 250 μm within the circle (C), with the largest dimension being located closest to the center (O) of the circle (C), and the Fresnel zones (2) have a constant dimension (Δr) of 250 μm outside the circle (C).

The disc 1 may have a convergence or a divergence, depending on the direction in which its thickness varies along the direction r, within each Fresnel zone 2. FIG. 1b corresponds to a convergent disc. The variation in the thickness of the disc within each zone 2 may be, in particular, a quadratic function of r. The disc of the invention may also have a cylinder, which enables taking an astigmatism of the wearer into account when necessary. In this particular embodiment, the disc is such that the smooth convex front face of said disc has a cylindrical surface or a toric surface.

Figure 2A:
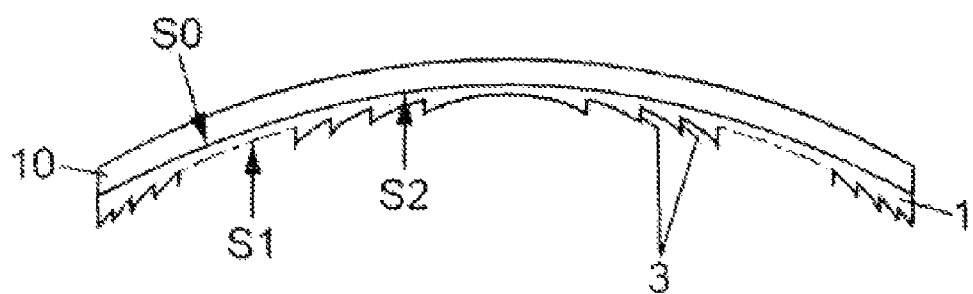
FIG. 2a is a cross-section view of an ophthalmic lens which can be mounted in a pair of glasses, equipped with a disc as shown in FIG. 1b.

FIG. 2a shows an ophthalmic lens that can be mounted in a pair of glasses and equipped, on its posterior face S0, or concave face, with a disc according to FIG. 1b. The lens in FIG. 2a, labeled 10, may be a sun-protective lens with no optical power, given that it has two parallel faces. The disc 1 then provides it with non-zero power, enabling it to correct the ametropia and possibly astigmatism of a wearer of the lens. In this manner, the disc 1 allows adapting any sun-protective lens to a wearer who has a visual distortion. The pair of glasses comprising such a lens 10 can then be chosen by the wearer based on aesthetics, tint, or shape of the associated frame. The lens in FIG. 2a, labeled 10, corresponds to a correction for myopia, as it is thinner at its center than at its edges. The disc 1 thus allows adapting the strength of the correction to the degree of myopia of the wearer. In this case, the disc 1 is placed on the lens 10 in a manner that superimposes the respective optical axes of the lens and the disc. An identical function is obtained for a lens that corrects hyperopia.

The disc 1 is applied to the posterior face S0 of the lens 10 which is smooth. This operation can be done directly by the practitioner or the wearer, onto the pair of glasses in which the lens is mounted in the frame chosen by the wearer.

FIG. 3 represents an exemplary variation in the amplitudes Δz of the height differences 3 along the radial direction r. When r is less than the radius $R_c$ of the circle C, the amplitudes Δz of the height differences 3 are constant and the radial dimension Δr of the zones 2 decreases for increasingly larger zones 2. Beyond the value $R_c$, meaning in a peripheral part of the disc 1 outside the circle C, the height differences 3 have amplitudes Δz which increase.

The disc 1 is attached to the face S0 of the lens 10, by means of the intrinsic adhesive properties of the material that make up said disc, or possibly by the use of a thin film of water between the two interfaces which acts as a vector to initiate the contact between the elements. Thus, in the invention, the material that makes up the disc must combine properties of transparency to enable it to retain the optical quality of the optical component that is to receive it, as well as tackiness properties, and physical properties which give it a certain flexibility in order for it to fit to the radius of curvature of the optical component to which it will be attached. Advantageously, the material that makes up the disc of the invention has a Shore A hardness of between 70 and 95, and a light scattering percentage of between 2.0% and 0.4%, preferably less than 1%. Materials usable in the context of the invention can be, in particular, transparent thermoplastic materials selected from among the polymers polyurethane, polyvinyl chloride, polyethylene terephthalate, poly(methyl methacrylate), and polycarbonate. Preferably the material constituting the disc is chosen from among polyurethane thermoplastics and polyvinyl chloride thermoplastic.

The material of the ophthalmic lens may be inorganic or organic. As a non-limiting example, organic material that can be used in the context of the invention can be the materials conventionally used in optics and in ophthalmology. For example, appropriate materials are substrates such as polycarbonate; polyamide; polyimide; polysulfone; poly(ethylene terephthalate) and polycarbonate copolymers; polyolefins, particularly polynorbornenes; diethylene glycol bis(allyl carbonate) polymers and copolymers; (meth)acrylate polymers and copolymers, particularly polymers and copolymers of (meth)acrylate derivatives of bisphenol-A; thio(meth) acrylate polymers and copolymers; urethane and thiourethane polymers and copolymers; epoxy polymers and copolymers and episulfide polymers and copolymers.

It is understood that many adaptations can be introduced into the embodiments detailed above, while retaining at least some of the advantages of the invention. In particular, a person skilled in the art will understand that the materials and values cited are for illustrative purposes only and can be modified.

The invention claimed is:

1. A disc intended to be attached to a curved concave surface (S0) of an optical component in order to modify an optical power of said component, the disc comprising a Fresnel lens formed of a series of Fresnel zones nested inside one another parallel to a smooth face of said disc (S2) and having height differences between two successive zones, said height differences being measured along a direction (z) perpendicular to the smooth face at an optical center of the disc (O), wherein the disc possesses:
    a generally spherical shape in addition to the height differences between successive Fresnel zones, said generally spherical shape having a mean radius of curvature of between 135 mm and 53 mm,
    and wherein the height differences between successive Fresnel zones are situated on a concave face (S1) of the disc, said height differences between successive Fresnel zones having:
        constant amplitudes within a radius circle (C) surrounding the optical center of the disc (O) and of a dimension defined as a function of the power of the disc,
        and variable amplitudes which increase in a peripheral part of the disc, when traveling away from the optical center (O) and outside said circle (C),
        said radius circle (C) having a value of between 5 mm and 25 mm for a power of between 1 diopter and 10 diopters, and a first central height difference amplitude greater than or equal to 5 μm, and
    wherein the height differences between successive Fresnel zones within the circle (C) have amplitudes of between 5 μm and 25 μm, and the height differences between successive Fresnel zones outside the circle (C) and out to a peripheral part of the disc have variable amplitudes of between 5 μm and 250 μm.

2. A disc according to claim 1, having a mean radius of curvature of between 88 mm and 53 mm, and preferably equal to 66 mm.

3. A disc according to claim 1, wherein the height differences between successive Fresnel zones within the circle (C) have amplitudes of between 10 μm and 20 μm.

4. A disc according to claim 1, wherein the Fresnel zones have a dimension ($\Delta r$) of between 100 μm and 5 mm along a radial direction (r) passing through the optical center (O) and perpendicular to an optical axis of the disc.

5. A disc according to claim 4, wherein the Fresnel zones have a variable dimension ($\Delta r$) of between 5 mm and 100 μm inside the circle (C), with the largest dimension being located closest to the center (O) of the circle (C), and the Fresnel zones have a constant dimension ($\Delta r$) of between 500 μm and 100 μm outside the circle.

6. A disc according to claim 5, wherein the Fresnel zones have a variable dimension ($\Delta r$) of between 2.5 mm and 250 μm within the circle (C), with the largest dimension being located closest to the center (O) of the circle (C), and the Fresnel zones have a constant dimension ($\Delta r$) of 250 μm outside the circle (C).

7. A disc according to claim 1, wherein the height differences between successive Fresnel zones in the peripheral zone (A) have constant amplitudes, said amplitude corresponding to the amplitude of the last height difference between successive Fresnel zones outside the circle (C), and a constant dimension ($\Delta r$) corresponding to the constant dimension ($\Delta r$) between successive Fresnel zones outside the circle (C).

8. A disc according to claim 1, having a mean thickness (e) of between 2 mm and 0.5 mm, measured perpendicularly to the smooth face (S2) of the disc.

9. A disc according to claim 1, wherein the smooth convex front face of said disc has a cylindrical surface or a toric surface.

10. A disc according claim 1, comprising a transparent material having a Shore A hardness of between 70 and 95.

11. A disc according to claim 1, comprising a transparent material having a light scattering percentage of between 2.0% and 0.4%, preferably less than 1%.

12. A disc according to claim 10, comprising a transparent thermoplastic material selected from among the polymers polyurethane, polyvinyl chloride, polyethylene terephthalate, poly(methyl methacrylate), and polycarbonate.

13. A disc according to claim 12, comprising a transparent material chosen from among polyurethane thermoplastics and polyvinyl chloride thermoplastic.

14. An optical element comprising a base optical component and a disc according to claim 1, said disc being attached to the concave rear face of said component by means of its smooth convex face.

15. An optical element according to claim 14, wherein the disk is attached to the component by means of a film of water placed as a vector between said disc and said component.

16. An element according to claim 14, wherein the base component is an ophthalmic lens.

17. An element according to claim 16, wherein the base component is an ophthalmic lens to correct ametropia.

18. An element according to claim 16, wherein the ophthalmic lens is tinted or partially reflective.

19. An element according to claim 14, wherein the base component is a lens adapted to fit in a pair of sunglasses.

20. An element according to claim 14, wherein the base component is a lens of a mask or goggles, in particular sun-protective goggles or ski goggles or a diving mask, or a visor, in particular a helmet visor.

21. A pair of glasses comprising at least one lens, and a disc according to claim 1 that is attached to said lens.

* * * * *